United States Patent
Spicer et al.

(10) Patent No.: US 8,858,742 B2
(45) Date of Patent: Oct. 14, 2014

(54) AUTOMATIC MONITORING OF VIBRATION WELDING EQUIPMENT

(71) Applicant: GM Global Technology Operations LLC, Detroit, MI (US)

(72) Inventors: John Patrick Spicer, Plymouth, MI (US); Debejyo Chakraborty, Novi, MI (US); Michael Anthony Wincek, Rochester, MI (US); Hui Wang, Highland, MI (US); Jeffrey A. Abell, Rochester Hills, MI (US); Jennifer Bracey, Holly, MI (US); Wayne W. Cai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/065,801

(22) Filed: Oct. 29, 2013

(65) Prior Publication Data

US 2014/0138012 A1    May 22, 2014

Related U.S. Application Data

(60) Provisional application No. 61/727,335, filed on Nov. 16, 2012.

(51) Int. Cl.
   *B32B 37/00* (2006.01)
   *B29C 65/08* (2006.01)
   *B06B 3/00* (2006.01)
   *B29C 65/00* (2006.01)

(52) U.S. Cl.
   CPC ............... *B32B 37/00* (2013.01); *B29C 65/08* (2013.01); *B06B 3/00* (2013.01); *B29C 66/90* (2013.01); *B29C 66/9121* (2013.01)
   USPC ............ 156/64; 156/73.1; 156/351; 156/359; 156/366; 156/378; 156/580.1

(58) Field of Classification Search
   USPC ............... 156/64, 73.1, 351, 359, 366, 580.1, 156/580.2, 378; 228/110.1, 1.1; 425/174.2; 264/442, 443, 444, 445; 310/323.01, 310/323.18
   See application file for complete search history.

(56) References Cited

U.S. PATENT DOCUMENTS

| | | | |
|---|---|---|---|
| 6,074,504 A * | 6/2000 | Yu et al. | 156/137 |
| 6,651,872 B2 * | 11/2003 | Johnson et al. | 228/264 |
| 8,408,445 B1 * | 4/2013 | Cai et al. | 228/102 |

* cited by examiner

*Primary Examiner* — James Sells
(74) *Attorney, Agent, or Firm* — Quinn Law Group, PLLC (57) ABSTRACT

A vibration welding system includes vibration welding equipment having a welding horn and anvil, a host device, a check station, and a robot. The robot moves the horn and anvil via an arm to the check station. Sensors, e.g., temperature sensors, are positioned with respect to the welding equipment. Additional sensors are positioned with respect to the check station, including a pressure-sensitive array. The host device, which monitors a condition of the welding equipment, measures signals via the sensors positioned with respect to the welding equipment when the horn is actively forming a weld. The robot moves the horn and anvil to the check station, activates the check station sensors at the check station, and determines a condition of the welding equipment by processing the received signals. Acoustic, force, temperature, displacement, amplitude, and/or attitude/gyroscopic sensors may be used.

19 Claims, 4 Drawing Sheets

AUTOMATIC MONITORING OF VIBRATION WELDING EQUIPMENT

CROSS REFERENCE TO RELATED APPLICATIONS

This application claims the benefit of U.S. Provisional Application No. 61/727,335, filed Nov. 16, 2012, which is hereby incorporated by reference in its entirety.

STATEMENT REGARDING FEDERALLY SPONSORED RESEARCH OR DEVELOPMENT

This invention was made with U.S. Government support under an Agreement/Project DE-EE0002217, Department of Energy American Recovery and Reinvestment Act (ARRA) of 2009, Battery Pack Manufacturing B511. The U.S. government may have certain rights in this invention.

TECHNICAL FIELD

The present disclosure relates to the automatic monitoring of vibration welding equipment.

BACKGROUND

Vibration welding is a technique in which vibration energy is applied in a particular frequency range to a clamped work piece. The frequency range is typically ultrasonic. Surface friction between vibrating adjacent surfaces of the clamped work piece generates heat, which ultimately softens and bonds the adjacent surfaces of the work piece. Vibration welding in a well controlled process, using properly functioning welding equipment, typically produces welds having a highly consistent and repeatable weld quality. However, while various approaches exist for ensuring control of a vibration welding process, such approaches may be less than optimal for the purposes of ongoing monitoring of a maintenance status or other status condition of the vibration welding equipment.

SUMMARY

A vibration welding system and method are disclosed herein for automatically monitoring a status condition of a suite of ultrasonic or other vibration welding equipment. The present system and methodology may be used in a production environment to quickly verify and quantify welding equipment set up, maintenance, and real-time diagnostics. As part of the present system, various sensors are positioned with respect to the vibration welding equipment in communication with a host device, i.e., one or more computers/computing devices having the requisite hardware and software needed for executing recorded computer-readable instructions embodying the present method, as explained in detail herein. Some of the sensors may be positioned in proximity to a welding process line, such as on a nearby check station, such that a welding robot can easily move some welding equipment, e.g., a welding horn and anvil, to the check station and periodically perform off-line condition monitoring steps. Other steps may be performed on-line while a weld is being formed.

The host device executes steps of the method at regular prescribed intervals to ensure that the vibration welding equipment maintains a desired performance consistency, and to ultimately ensure that any welds formed via the welding equipment have a consistent and repeatable level of quality.

By executing the various steps embodying the present method, the host device can quickly diagnose potential welding process/equipment problems. Unlike conventional closed-loop process control approaches, the present system and method may be used to accurately identify the root cause or causes of such problems. The ability to do this in real-time, in conjunction with existing welding process control techniques, may facilitate rapid corrective action with respect to the welding equipment.

In particular, a vibration welding system is disclosed herein having vibration welding equipment including at least a welding horn and a welding anvil. The system also includes a host device, a check station, and a robot having an arm that is connected to the welding horn and anvil. The robot rotates or otherwise moves the welding horn and the anvil to the check station at prescribed intervals, such as by pivoting from a process conveyor to the check station once per shift. Additionally, the system includes a first and second plurality of sensors. The first plurality of sensors is positioned with respect to the vibration welding equipment. The second plurality of sensors, which may be positioned with respect to the check station, may include a pressure-sensitive array and/or load cells.

The host device, which is in communication with the first and second pluralities of sensors, has a processor and tangible, non-transitory memory on which is recorded instructions for monitoring a status condition of the vibration welding equipment noted above. The host device is configured to execute the instructions from memory to thereby receive a first set of signals from the first plurality of sensors when the welding horn is actively forming a weld on a work piece, i.e., while the welding horn is engaged in the process of forming the weld.

Execution of the instructions causes the robot to move the welding horn and the anvil to the check station at the prescribed interval, to activate the second plurality of sensors when the welding horn and the anvil are both positioned at the check station, and to receive a second set of signals via the second plurality of sensors. The host device then determines the status condition of the welding equipment, for instance as a function of the first and second sets of signals.

The first plurality of sensors may include a temperature sensor(s) connected in proximity to the welding equipment. In another embodiment, the vibration welding equipment may include a transducer such as a piezoelectric stack that is connected to the welding horn. The transducer causes the welding horn to vibrate. In this instance, the first plurality of sensors may include a temperature sensor in the form of a thermocouple or thermistor connected to the piezoelectric stack. Another temperature sensor may be used to measure a temperature of a welding controller. The temperatures of all three elements, i.e., of the welding horn, the transducer, and the controller, may impact the welding frequency, and thus the ultimate weld quality, and thus are used herein as control parameters in determining the status condition of the welding equipment.

The first plurality of sensors may also include an acoustic sensor. The host device may be configured to transmit a pre-recorded baseline acoustic signal to the acoustic sensor, for instance via a speaker, and to record the transmitted pre-recorded baseline acoustic signal via the acoustic sensor. The host device may also compare the recorded signal to the pre-recorded baseline signal to determine a signal variance between the compared signals. Also, a three-axis gyroscope may be optionally connected to a weld head of the welding horn and used to measure the pitch, yaw, and roll of the weld head as part of the first set of signals. A displacement sensor may be connected to the weld head and used to measure a distance of separation between the work piece and the weld head, also as part of the first set of signals, and to ensure proper weld positioning with respect to the work piece.

The host device may optionally include recorded image processing instructions or code/computer vision logic. In this instance, the host device may be configured to detect and quantify an imprint pattern on the welding horn via selective execution of the image processing code. As is known in the art, various software approaches exist for recognizing a pattern or image, including neural network processing or image comparison to databases of known good/bad imprint patterns. Such an imprint pattern can be used for various diagnostic purposes, including cleanliness, alignment, tool wear, etc.

A method for determining a status condition of vibration welding equipment includes forming a weld on a work piece via the vibration welding equipment, and receiving a first set of signals from a first plurality of sensors while actively forming the weld on the work piece, including receiving at least one temperature of the vibration welding equipment. The method also includes commanding a welding robot to move the welding horn and the welding anvil to a check station, and selectively activating a second plurality of sensors, including a pressure-sensitive array, when the welding horn and the welding anvil reach the check station.

Additionally, the method includes receiving a second set of signals from a second plurality of sensors positioned with respect to the check station, including receiving at least a measured welding force from the pressure-sensitive array. The first and second sets of signals are processed via the processor to thereby determine a condition of the vibration welding equipment.

The above features and advantages and other features and advantages of the present invention are readily apparent from the following detailed description of the best modes for carrying out the invention when taken in connection with the accompanying drawings.

DETAILED DESCRIPTION

Figure 1:
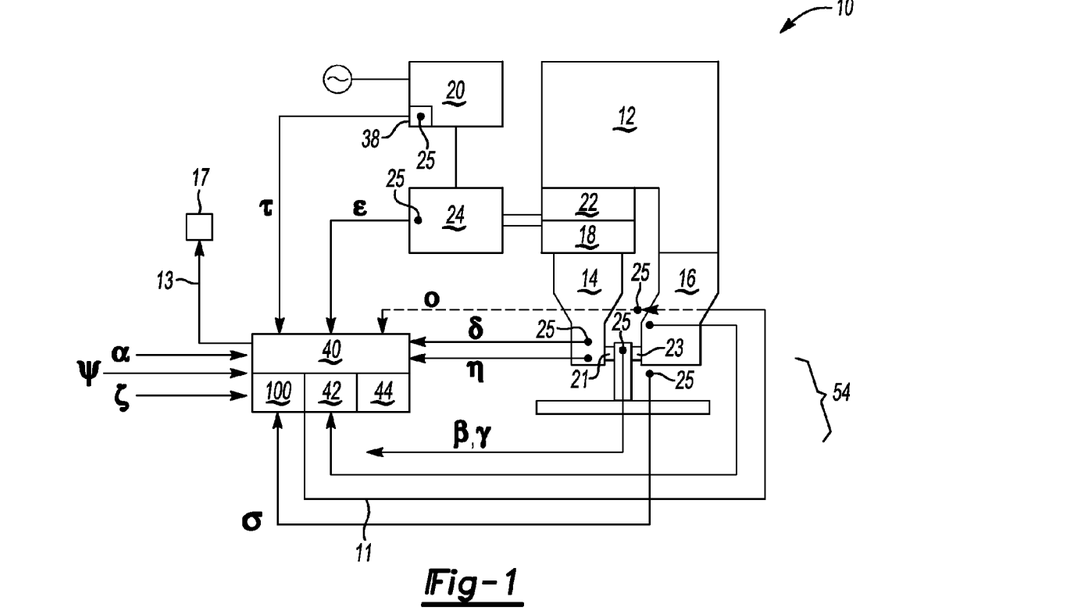
FIG. 1 is a schematic illustration of an example suite of vibration welding equipment which may be monitored as set forth herein.
Figure 2:
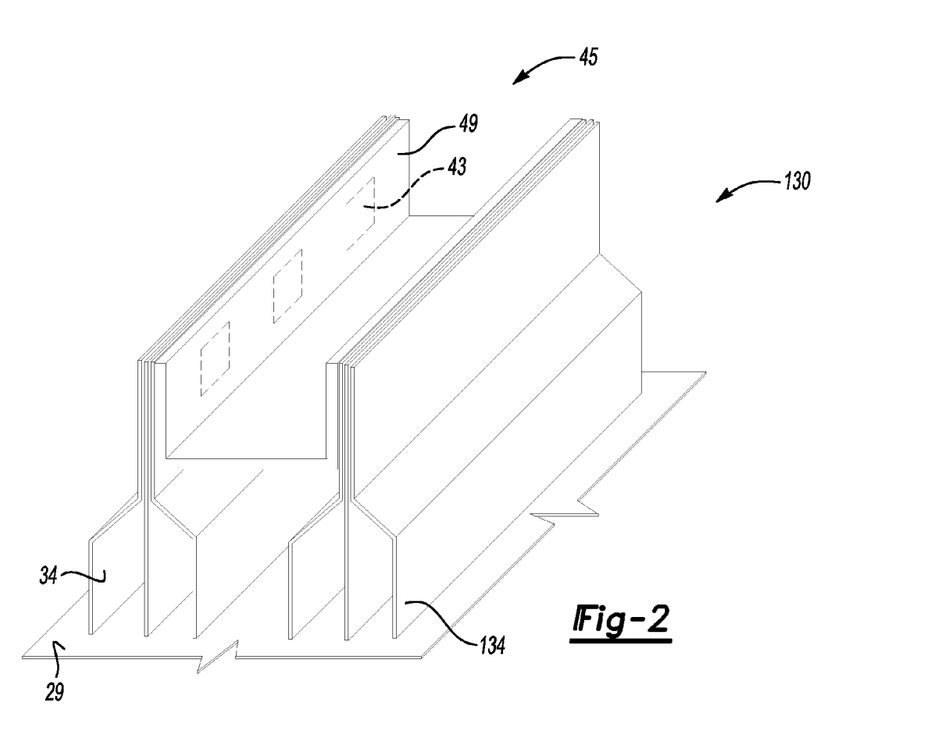
FIG. 2 is a schematic perspective view of an example work piece in the form of a multi-cell battery pack portion which may be welded using the vibration welding equipment shown in FIG. 1.

Referring to the drawings, wherein like reference numbers refer to like components throughout the several Figures, a suite of vibration welding equipment 10 is shown schematically in FIG. 1. The vibration welding equipment 10 may be used, for instance, to form welds in the fabrication of a work piece, with an example work piece 130 shown in FIG. 2 in the form of a portion of a multi-cell battery pack. While other types of work pieces may be ultrasonically welded without departing from the intended inventive scope, the example work piece 130 of FIG. 2 is typical of the type of welded system in which high-quality/durable welds must be formed in a repeatable process.

A host device 40 is in communication with the vibration welding equipment 10 and sensors 25 positioned with respect to the vibration welding equipment 10. Each sensor 25 has a different function, with a set of example sensors 25B-K described in detail below with reference to FIG. 3. The host device 40, i.e., a computer, also includes a processor 42 and tangible, non-transitory memory 44 on which is recorded instructions embodying the present method 100, an example of which is shown in FIG. 5. The host device 40 periodically executes the instructions via the processor 42 to thereby monitor a maintenance status or other status condition of the vibration welding equipment 10. As part of this process, the vibration welding equipment 10 may be tested at a nearby check station 54, with such testing described in further detail below with reference to FIGS. 3, 4A, and 4B.

The example vibration welding equipment 10 of FIG. 1 may include a welder device 12 having a sonotrode/welding horn 14 and a welding anvil 16, with the welder device 12 providing the backing structure and support for the welding horn 14 and the welding anvil 16. The vibration welding equipment 10 may also include a welding controller 20. The welding horn 14 is typically connected to a transducer 24, for instance a piezoelectric stack. Signals from the welding controller 20 cause the transducer 24 to vibrate at a calibrated frequency, which in turn vibrates the welding horn 14 at that same frequency, possibly amplified by a booster 22.

As will be understood by those of ordinary skill in the art, a welding controller/power supply of the type used for vibration welding, such as the welding controller 20 of FIG. 1, may be electrically-connected to a suitable energy source, typically a 50-60 Hz wall socket. The welding controller 20 may include, for example, an oscillator or timer 38, as well as voltage rectifiers, transformers, power inverters, and/or other hardware which ultimately transforms the source power, whatever its form, into vibration control signals. The control signals ultimately command predetermined waveform characteristic(s), for example a periodic signal having a frequency of about 20 kHz to about 40 kHz or more depending on the particular welding application.

The welding horn 14 shown in FIG. 1 typically includes a weld head 21 having a textured knurl pattern, e.g., bumps and/or ridges, which are suitable for gripping and holding a work piece clamped between the welding horn 14 and the anvil 16. An anvil head 23 of the anvil 16 typically includes a similar knurl pattern. The vibration welding equipment 10 may also include a booster 22, i.e., a mechanical amplifier, which increases the amplitude of any commanded mechanical vibration from the transducer 24 as needed.

The host device 40 of FIG. 1 receives signals from each of the sensors 25 and then processes the received signals in the execution of the method 100. The various signals are indicated in FIG. 1 as a cleanliness signal ( ) alignment, tool wear, and welding force signals ($\beta$, and optionally $\gamma$), amplitude signals ($\delta$), displacement signals ($\sigma$), and acoustic signals (o). Additional signals may include a welding height signal ($\phi$), a weld head attitude signal ($\zeta$), i.e., pitch, yaw, and roll, a welding horn temperature ($\eta$), a transducer temperature ($\epsilon$), and possibly the controller temperature ($\tau$) of the welding controller 20 and/or other temperatures depending on the application. The temperature of any of the sensors used to measure the various signals above, e.g., the displacement signals ($\sigma$), may be measured as well, as calibration of some or all of the sensors 25 may be impacted by changing temperature. The host device 40 may also transmit an acoustic test signal (arrow 11) as part of the method 100, and also may output a control signal (arrow 13) to an external device 17, e.g., a quality indicator. Some of these signals are received from the check station 54 as described below with reference to FIGS. 3 and 4A, with all of these signals and their corresponding sensors 25 described in further detail below with reference to FIG. 3.

The host device 40 of FIG. 1 may include, as noted above, the processor 42 and memory 44. The memory 44 may include any required read only memory (ROM), flash, optical, and/or other non-transitory memory. The host device 40 may also include transitory memory, e.g., any required random access memory (RAM), electrically-programmable read-only memory (EPROM), etc. The host device 40 may also include additional circuitry such as a high-speed clock (not shown), analog-to-digital circuitry, digital-to-analog circuitry, a digital signal processor, and the necessary input/output devices and other signal conditioning and/or buffer circuitry. The host device 40 thus provides the necessary hardware components needed to execute process instructions embodying the present method 100.

Referring to FIG. 2, in a non-limiting example embodiment, a work piece 130 is shown as a portion of a multi-cell battery having an elongated conductive interconnecting member 45. A full battery module may include an extended series of interconnecting members 45 arranged side-by-side in multiple rows. Each interconnecting member 45 joins oppositely-charged battery cell tabs 34, 134, of adjacent battery cells, with the battery cell tabs 34, 134 forming individual electrode extensions of a given battery cell. Each battery cell tab 34, 134 is internally-welded, below an interconnect board 29 to the various anodes or cathodes comprising that particular battery cell, as is well understood by those of ordinary skill in the art. The battery cell tabs 34, 134 may be welded using the vibration welding equipment 10 of FIG. 1 to a longitudinal side wall 49 of a given interconnecting member 45, with substantially identical welds 43 formed at each interconnecting member 45.

Figure 3:
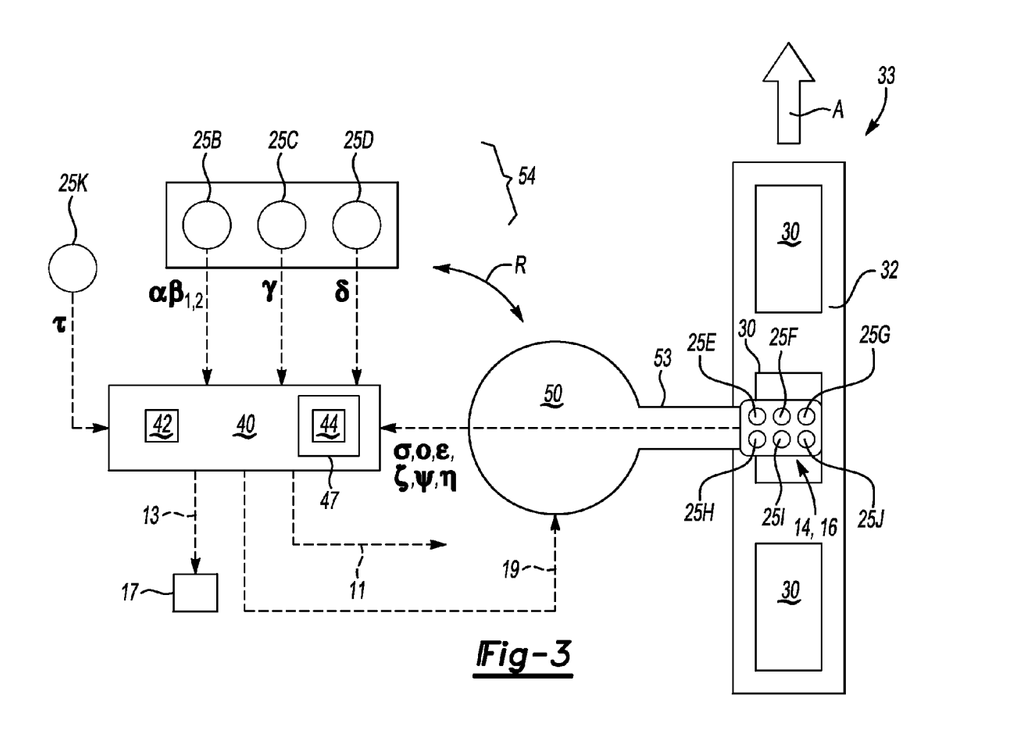
FIG. 3 is a schematic illustration of a system for monitoring a condition of the vibration welding equipment shown in FIG. 1.

Referring to FIG. 3, in an example vibration welding process 33, the vibration welding equipment 10 of FIG. 1 may be used to form welds on a set of work pieces 30 as the work pieces 30 move along a conveyor 32 in the direction of arrow A. A welding robot 50 may move between the conveyor 32 and the check station 54 as indicated by arrow R. Some components of the vibration welding equipment 10 of FIG. 1 may be disposed on an arm 53 of the robot 50, including at least the welding horn 14 and anvil 16 described above. In normal operation, the robot 50 can be used to form welds on the work pieces 30 as the work pieces 30 move on the conveyor 32, or alternatively as the robot 50 moves with respect to the work pieces 30. Periodically, e.g., once per shift or once per a calibrated number of welds, the robot 50 may rotate toward the check station 54 and perform certain condition monitoring steps. The measured signals are then transmitted to the host device 40 of FIG. 1.

Signals measured at the check station 54 may include a horn cleaning signal ($\alpha$), which can be measured via the pressure sensitive array 25B, and alignment, tool wear, and welding force signals ($\beta$) also measured via the pressure-sensitive array 25B, with alternative welding force signals ($\gamma$) optionally measured via a load cell 25C. Alignment can also be determined from a configuration of two or more load cells 25C arranged to identify misalignments through imbalances in the clamping load, i.e., static clamping force $F_C$ of FIG. 4A. An amplitude sensor 25D may be embodied as a non-contact laser interferometric sensor which measures amplitude signals ($\delta$), i.e., the amplitude of motion/vibration of the horn 14 as the horn 14 oscillates. The amplitude is measured along the direction of the longitudinal axis of the horn 14 at the free/distal end of the horn 14. Such a sensor can measure a single point on the end of the horn 14, at a sampling rate well in excess of the vibration frequency, e.g., at least 5 times faster. In a particular embodiment, for a 20 kH vibration frequency, a sampling rate of 1 MHz may be used to measure a sinusoidal displacement of 0 to 0.1 mm, with the sensor 25D placed within 5 cm to 10 cm of the sensor 25D.

Of these signals, the horn cleaning signal ($\sigma$) describes the general cleanliness of the welding horn 14. At a separate cleaning station (not shown), the welding equipment 10 may be actuated on a bare piece of copper to remove any build-up of aluminum in the knurls of the welding horn 14. Welding horns with excessive buildup, which fill the valleys in any knurl patterns of the horn 14, may experience tool slippage, cold welds, bulging welds, a change in signal profiles, and a high suspect rate. Thus, the pressure-sensitive array 25B may be used to quantify tool cleanliness resulting from a previous off-line cleaning process via an automatic check, e.g., using image processing steps. For example, the host device 40 of FIG. 1 may execute image processing code 47, via the processor 42 from memory 44, to detect and quantify an imprint pattern. If the welding horn 14 is still dirty, as determined from the imprint pattern, the cleaning process may be repeated as a maintenance step before resuming welding.

While shown as one signal ($\beta$) for illustrative simplicity, the alignment, tool wear, and welding force signals noted above may be embodied as separate signals $\beta_1$-$\beta_3$. Signal $\beta_1$ may describe the alignment of the welding horn 14 and anvil 16 with respect to each other, a value which may be optionally detected via the gage tool 36 shown in FIGS. 4C and 4D and explained below, while signal $\beta_2$ may describe the tool wear and signal $\beta_3$ may describe the welding force. As noted above, the signals $\beta_1$-$\beta_3$ may be measured via a pressure-sensitive array 25B, which can produce a calibrated color image as an output. Other sensors used herein may produce single data points such as temperature or time series signals as outputs.

In a particular embodiment, the pressure-sensitive array 25B may be a small nanopolymer-based tactile surface sensor having piezoelectric/resistive pressure sensing properties, which can record and interpret pressure distribution and magnitude between two contacting or mating surfaces. As used herein, "small" refers in one embodiment to approximately 5 cm×5 cm. In such an embodiment, the pressure-sensitive array 25B may define a 32×32 matrix with 1024 total sensing points, calibrated for 0 to 150 psig, as shown in FIG. 4B.

Figure 4A:
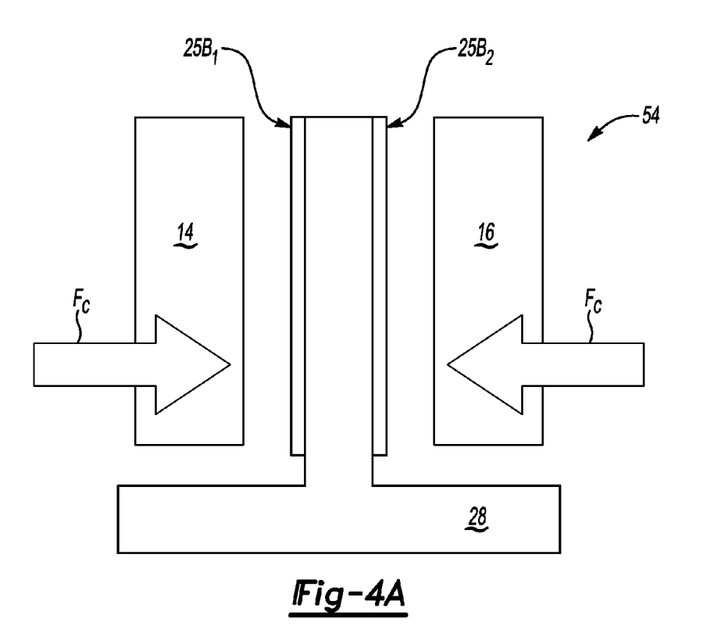
FIG. 4A is a schematic illustration of an example pressure-sensitive array which may be used to measure a condition of the vibration welding equipment shown in FIG. 1.
Figure 4B:
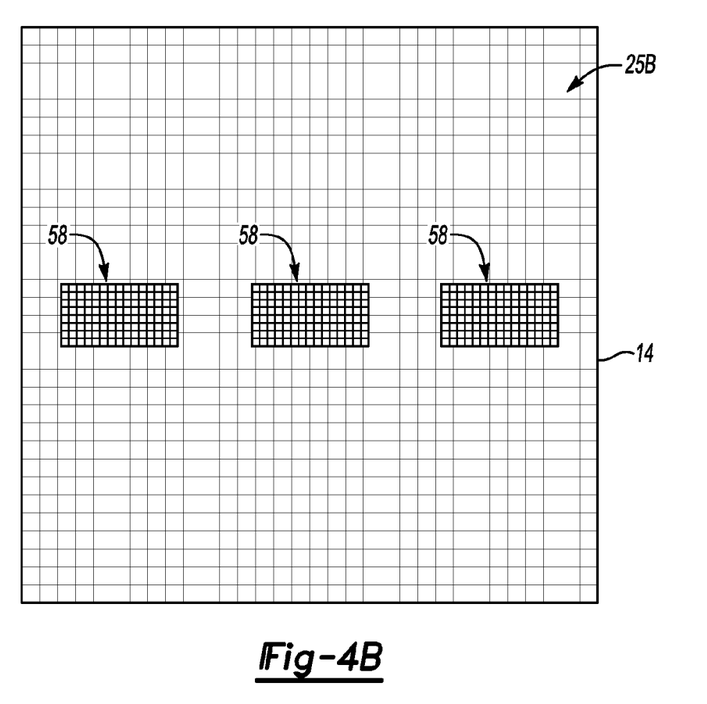
FIG. 4B is a schematic illustration of a portion of the output of the pressure-sensitive array of FIG. 4A.
Figure 5:
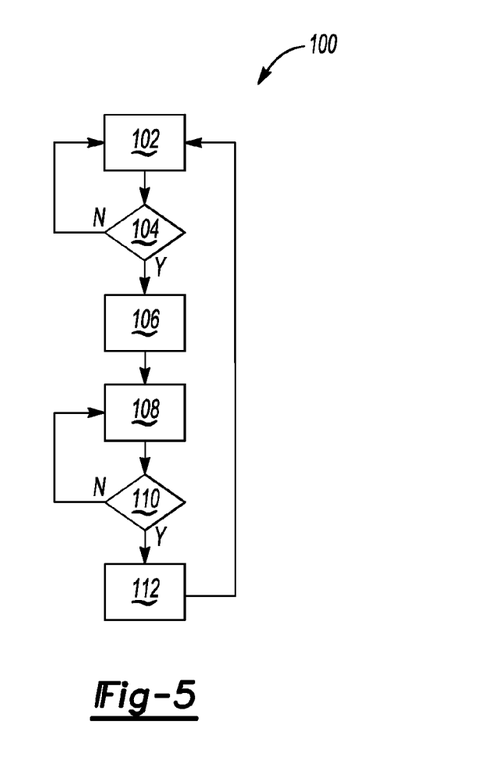
FIG. 5 is a flow chart describing an example method for monitoring a condition of the vibration welding equipment shown in FIG. 1.

Referring briefly to FIGS. 4A and 4B, FIG. 4A illustrates an example configuration for the pressure-sensitive array 25B. The welding horn 14 and the anvil 16 may be clamped together at the check station 54 of FIG. 3 with a clamping force indicated by arrows $F_C$. The pressure-sensitive array 25B may be embodied as a pair of pressure-sensitive sensor arrays 25B$_1$, 25B$_2$ connected to a solid frame 28 or other design as shown providing a solid and flat backing surface providing a base suitable for measurements, such that the pressure-sensitive array 25B is compressed by the clamping force (arrows $F_C$). FIG. 4B shows the pressure-sensitive array 25B on the side of the welding horn 14, with three different zones 58 indicating the specific locations of the knurls on the horn 14 that contact the sensor array at the locus of three different welds. Such an embodiment may be useful in forming welds in the example work piece 130 of FIG. 2, wherein three different welds are typically formed at a time. Other designs may have fewer or more knurl areas.

Referring again to FIG. 3, the signal β, i.e., $β_1$ and $β_2$, which represents the tool alignment and tool wear, respectively, may also use advanced image processing techniques to quantify the level of tool wear. Uneven wear may result in uneven distribution of weld energy, which may change the signal profiles and lead to cold welds, particularly between cell tabs 34 of FIG. 2. Wear is usually addressed by limiting the use of a given tool to a number of cycles before replacement. The present approach directly measures tool wear to thereby extend tool life.

The tool alignment signal, i.e., signal $β_1$, could consist of multiple force measurements normal to the surface being contacted, with these measurements used to extract a point cloud estimate. As is known in the art, the term "point cloud" refers to a set of vertices in a three-dimensional coordinate system, e.g., the Cartesian X, Y, and Z coordinate system, which represents the external surface of an object, in this instance the surfaces of the welding horn 14 and the anvil 16. Using such measurements, the host device 40 could detect the edges of the welding horn 14 and the anvil 16, their contact area, and/or their orientation in order to determine the correct alignment.

Figure 4C:
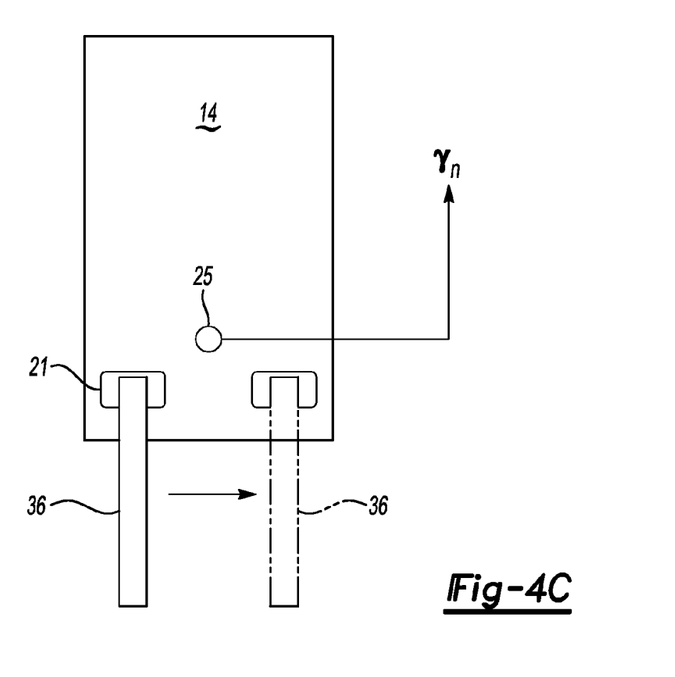
FIGS. 4C and 4D are schematic illustrations of an optional gage tool for determining alignment of the welding equipment.
Figure 4D:
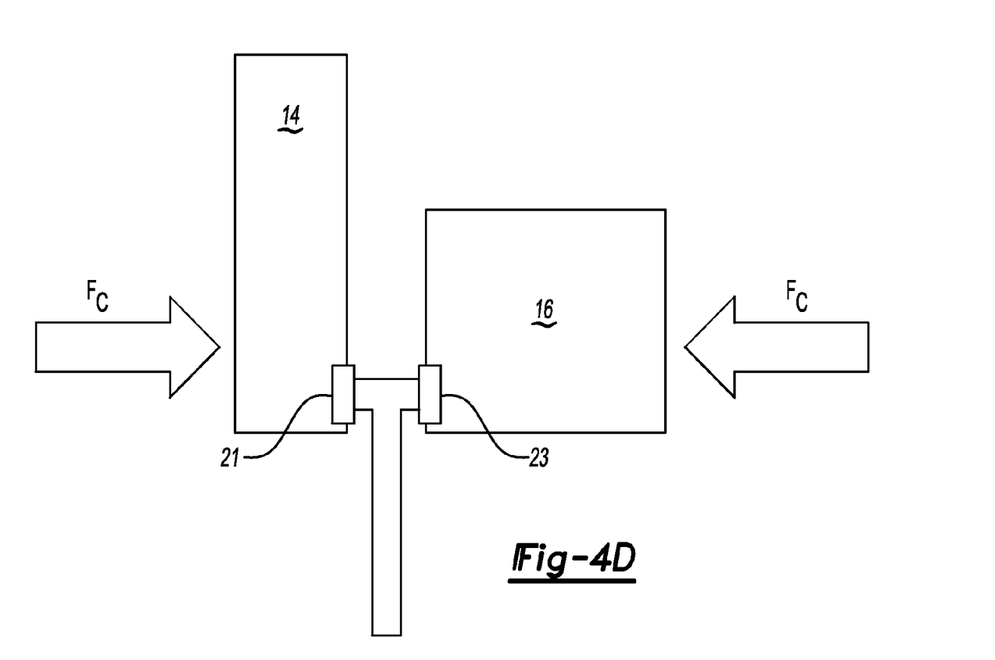

In another embodiment as shown in FIGS. 4C and 4D, for instance on a welding horn 14 having two weld pads 21, the host device 40 may be programmed to move the welding horn 14 and clamp the horn 14 onto a customized gage tool 36 such as a T-shaped piece of hardened steel. FIGS. 4C and 4D are not to scale. In actuality, the gage tool 36 may be relatively small, e.g., maximum dimensions of 40 mm tall×4 mm wide× 2-4 mm thick. The welding horn 14 clamps onto the opposite free ends 46 of the gage tool 36 with as much pressure as needed to take an accurate reading. Generally, the clamping pressure used to clamp the gage tool 36 should be less than the full clamping pressure used for welding to protect the gage tool 36 or horn 14/anvil 16. The sensor 25C measures the displacement signal ($γ_n$) for each. The host device 40 calculates a misalignment value as the difference between the first measurement (n=1) and the second measurement (n=2). The host device 40 can then execute a control action with respect to the welding equipment 10 when the calculated misalignment value exceeds a threshold.

In other embodiments, the welding horn 14 could have only one welding pad 21, or it may have two or more, or clamping may occur on a smooth surface of the welding horn 14 apart from the welding pad 21 to avoid the knurl patterns of the welding horn. In all embodiments, the welding horn 14 should be aligned properly with respect to the work piece and the anvil 16. If not, welding might occur differently in one part of the horn 14 relative to another. If there are two welding pads, e.g., one on each side of the horn 14, one welding pad 21 might weld and the other might not, assuming the latter is not contacting the work piece with sufficient force due to misalignment. Another embodiment may include taking multiple displacement readings at one location and averaging them via the host device 40, or multiple readings at multiple positions and performing a least squares regression operation to determine the amount of misalignment.

As shown in FIG. 4D, the free ends 46 of the gage tool 36 should be perpendicular to the pads 21, 23 between which the gage tool 36 is positioned. Various means for accomplishing this may be used, including fixtures or a rotating device which allows the gage tool 36 to rotate in the presence of a clamping force (arrows $F_C$) until the free ends 46 are perpendicular to the weld pads 21, 23 as shown in FIG. 4C. Using the differences in distance, the host device 40 could also compute the amount of angular misalignment. If the alignment value exceeded a calibrated threshold or permissible tolerance, then the welding horn 14 would need to be re-aligned to preserve weld quality.

With reference again to FIG. 3, tool wear signals, i.e., signals $β_2$, can be used to detect improper tooling or process conditions. Thus, the host device 40 can predict when a tool will wear out, and could schedule replacement of the tool prior to that time. The sensor 25 of FIG. 1 that is used to measure the welding force $β_3$ may be part of the pressure-sensitive array 25B shown in FIGS. 4A and 4B, or it may be embedded in the material of the welding horn 14, e.g., as a miniature compression load cell, with one sensor 25 centered at each welding pad 21 of the welding horn 14. Statistical estimation of welding pressure may be performed from an obtained point cloud. Alternatively, the optional load sensor 25C of FIG. 3 may be positioned in the same location and used to perform a threshold force measurement. Direct measurement from such a load cell 25C, with statistical filtering, can be compared to upper and lower thresholds to enforce a consistent weld pressure, for instance in a closed loop by dynamically adjusting weld pressure to maintain a target pressure.

Still referring to FIG. 3, the amplitude signals (δ) may be measured via a high-speed/high-frequency displacement sensor, i.e., sensor 25C, which is positioned with respect to the welding horn 14 of FIG. 1. The amplitude signals (δ) describe the linear movement of the welding horn 14, and may be measured from a fixed reference location every (n) welding cycles. The amplitude signals (δ) could be compared to upper and lower limits. Likewise, the displacement signals (σ) describe the distance between the welding horn 14 and the surface being welded. The purpose of the displacement signals (σ) is to accurately monitor the position of the weld head 21 of FIG. 1 on the work piece, e.g., work piece 130 of FIG. 2, and to ensure that the weld head 21 is at the proper height with respect to the work piece. Such a measurement can occur once for every weld that is formed. As possible control steps, this information could be used to stop the welding process if the displacement signals (σ) indicate that welding position has drifted too low or too high. The same information back could be fed back to the robot 50 of FIG. 3 so that adjustments can be made in real time, and/or to any process monitoring systems as a feature of interest to improve the monitoring system performance.

The acoustic signals (o) may be measured via the acoustic sensor 25F, e.g., a microphone of the type normally used to detect an acoustic signal during the welding process as part of a process monitoring approach. Periodically, the acoustic sensor 25F may be fed calibrated acoustic signals (arrow 11) by the host device 40, e.g., via a speaker (not shown), which may occur whenever the robot 50 of FIG. 3 is positioned at the check station 54. The acoustic sensor 25F records the transmitted acoustic signals (arrow 11). The host device 40 may then compare the recorded signal to the acoustic signals (arrow 11). Such an approach may proactively detect a failing microphone, cable, and the like, and thus eliminate the likelihood that false data will be used in real time monitoring and control of the welding equipment 10 of FIG. 1.

Additional signals may include a welding height signal (φ), an attitude signal (ζ), i.e., pitch, yaw, and roll, horn temperature (η), a transducer temperature (ε), and a controller temperature (τ). The welding height signal (φ) may be measured via a sensor 25G, e.g., a laser depth sensor, which may be mounted to the welder device 12 of FIG. 1. The laser measurements may be fed to the host device 40 and used to verify that the welder device 12 is positioned at the correct height for each weld that is formed. Another sensor 25H in the form of a 3-axis gyroscope may be mounted to the weld head 21 of FIG. 1, and used to measure the attitude of the weld head 21 of FIG. 1. The measured attitude signal (ζ), which describes the pitch, yaw, and roll of the weld head 21 of FIG. 1 and may be fed back to the host device 40. In turn, the host device 40, may transmit a control signal (arrow 19) to the robot 50 of FIG. 3 to command proper alignment of the weld head 21 for each weld and/or other positioning of the robot 50 and/or for process monitoring.

Regarding the horn temperature (η), the transducer temperature (ε), and the controller temperature (τ), these signals may be measured by temperature sensors 25I, 25J, and 25K, respectively. The temperature sensor 25I may be mounted within or remotely with respect to the welding horn 14, e.g., to the welder device 12, while the temperature sensors 25J and 25K may be mounted to the respective transducer 24 and welding controller 20 of FIG. 1. Alternatively, the temperature sensor 25I may be embodied as a non-contact type, e.g., a sensor configured to remotely sense the temperature of the welding horn 14 via laser or other by another remote sensing technique. Increases in the temperature of the welding horn 14 can cause a reduction in frequency of the transducer 24 and the welding horn 14, which may lead to increased instances of suspect welds.

This effect may be represented mathematically as:

$$\frac{f_r}{f_{r0}} = \sqrt{\frac{(E_0 + \beta \Delta T)(1 + \alpha \Delta T)}{E_0}}$$

wherein $f_r$ is a temperature-adjusted natural frequency, $f_{r0}$ is the natural frequency at room temperature, typically 70° F., $E_0$ is Young's modulus, $\Delta T$ is the temperature shift, $\alpha$ mean coefficient of linear thermal expansion, and $\beta$ is the linear change of Young's modulus. Accordingly, the temperature values of the welding horn 14 and the transducer 24 may be valuable control parameters for preventing degradation in weld quality.

It is recognized herein that the above relationship between horn temperature (η) and welding frequency provide various possible insights into the operation of the vibration welding equipment 10 shown in FIG. 1. For instance, it is noted that welding frequency tends to decrease when horn temperature (η) increases. Thus, the welding frequency is generally higher at the start of a production shift than at the end of the same shift. As the welding horn 14 of FIG. 1 warms up, the welding frequency can decrease, e.g., by approximately 50-100 Hz. If there is a stop in production due to a break, equipment down time, or other reason, the welding horn 14 will cool off. When the welding process eventually restarts, the welding frequency will be higher than it was when production stopped.

Such temperature changes can complicate placement of precise high/low thresholds around the welding frequency for the purposes of monitoring the welding process. Therefore, the present approach may include measuring the temperature (η) of the welding horn 14, correlating the temperature change with a corresponding welding frequency change, e.g., in a lookup table, and then compensating the observed welding frequency for known temperature-related changes, as well as placing tighter control limits around the welding frequency to achieve improved sensitivity for detecting welder problems. This in turn can make it easier to discern when welding frequency changes are occurring due to non-temperature related effects, for instance due to a failing power supply.

As part of this approach, the host device 40 may compute a measured welding frequency as a new, normalized, measured welding frequency using the established relationship between frequency and temperature noted above, and then monitor the normalized frequency to determine a condition of the welding equipment 10. That is, the host device 40 normalizes measured frequency values so that the measurements correspond to what the welding frequency would be at a nominal temperature. Thus, there will be two different frequency measurements that can be given as an output: the actual measured welding frequency, which will vary with horn temperature, and the normalized welding frequency, which is reported as if the horn temperature were at a nominal temperature.

The same principles may be applied to changes that are observed in measurements from the displacement sensor 25C, which may measure amplitude as well as displacement (linear motion) as the welding horn 14 compresses the work piece material during vibration welding. Measurements supporting the present disclosure have shown that even small temperature changes can dramatically impact the measurement values. Thus, the present approach may include compensating for temperature changes in other sensors, such as the displacement sensor 25C, so that tighter limits can be enforced, such as around a measured normalized displacement in this example, as well as to more clearly discern processing issues. Such issues may include, for instance, too many (or too few) layers of material in the welding stack, excessive (or too little) material compaction during welding, misalignment of the welding tools, excessive material build-up on the welding tools, tool breakage or excessive tool wear, etc.

Temperature compensated values can then be used by the host device 40 to improve the detection of "bad" welds in real time. In the example of the displacement sensor 25C, the host device 40 may be programmed to detect unsatisfactory or bad welds based on values observed from the displacement sensor 25C, or in combination with values from other sensors 25 such as the acoustic sensor 25F. Bad welds are often associated with changes in the amount of material compaction that takes place during welding. Too much or too little compaction can be related to bad welds. Therefore, the host device 40 may be programmed to receive displacement measurements from the displacement sensor(s) 25C, as well as a temperature of the displacement sensor(s) 25C, in real-time during formation of the weld, and then temperature-compensate the displacement measurements to a normalized temperature so that the effects of temperature change on displacement are eliminated. This processing step, if used in the real-time monitoring of a weld process, may facilitate detection of changes that can occur when bad welds are produced.

In addition to improved machine diagnostics, the relationship between the welding frequency and the temperature (η) of the welding horn 14 can be used to improve welding process monitoring. Unsatisfactory or qualitatively "bad" welds may be identified by changes in the welding frequency as observed by a microphone, e.g., acoustic sensor 25F. That is, when "bad" welds occur, the welding process effectively plays a lower note, i.e., a lower observed frequency of vibration. However, as noted above, when the horn temperature (η) increases, the welding frequency decreases. Therefore, temperature changes can make it difficult to accurately discern bad welds from conditions where the horn temperature (η) is relatively high. By measuring the temperature of the welding horn 14, one can compensate the observed welding frequency for temperature-related changes and identify bad welds more easily.

The timer 38 of the welding controller 20 shown in FIG. 1, which may be embodied as one or more timers, has a frequency of oscillation (f) that varies with the temperature (T) of the welding controller 20, i.e., $$f = \frac{1}{T}.$$

Thus, frequency of oscillation may be measured at the level of the welding controller 20 via the temperature sensor 25K, alone or in conjunction with the acoustic sensor 25F. Frequency can be adjusted or compensated inside of the welding controller 20, either automatically or manually, as needed.

An example embodiment of the method 100 will now be described with reference to FIG. 5. Commencing at step 102, welding proceeds in the typical manner. For instance, when manufacturing multi-cell batteries of the type shown in FIG. 2, the conveyor 32 of FIG. 3 may move the work pieces 130 into place in front of the robot 50 shown in the same Figure. The welding horn 14 and the anvil 16 of FIG. 1 clamp onto the work piece 30 and form the required welds. During step 102, any of the sensors 25 of FIG. 1 positioned on the vibration welding equipment 10 continue to measure their respective data, including for instance the sensors 25G, 25H, 25I, and 25J of FIG. 3. As step 102 is ongoing, the method 100 proceeds to step 104.

At step 104, the host device 40 may reference a timer, or alternatively a counter, in order to determine if a calibrated amount of time or a calibrated number of welding cycles has occurred. In some embodiments, step 104 may be triggered manually, e.g., by an operator at the beginning or end of a shift. If the host device 40 determines that a predetermined/calibrated number or welding cycles has occurred, the method 100 proceeds to step 106. Otherwise, steps 102 and 104 are repeated.

Step 106 entails rotating the robot 50 of FIG. 3 toward the check station 54. As part of step 106, the conveyor 32 of the same Figure is temporarily stopped. The method 100 proceeds to step 108 when the robot 50 has moved the welding horn 14 and the anvil 16 into position at the check station 54.

At step 108, the host device 40 receives the signals described above with reference to FIG. 3. The signals measured at the check station 54 of FIG. 3 may include the cleaning signal (α), the alignment, tool wear, tool cleanliness, and welding force signals (β and, if used, γ), and the amplitude signals (δ), all of which are described above. As part of step 108, the host device 40 may challenge or interrogate the acoustic sensor 25F with the acoustic signals (arrow 11) to determine if the acoustic sensor 25F is functioning properly. As the measurements are being taken, the method 100 proceeds to step 110.

Step 110 entails determining if all required values have been measured. If not, step 108 is repeated. The method 100 proceeds to step 112 once all required measurements have been taken.

At step 112, the host device 40 compares all recorded values from step 110 to calibrated thresholds, previously recorded in memory 44, to determine if any of the values falls outside of the band defined by these thresholds. In this manner, the host device 40 determines a condition of the welding equipment 10 as a function of the collective signals. Appropriate corrective actions may be taken as part of step 112 in the event that any of the values are determined to be outside of their allowable limits. For example, if excessive temperatures are measured at the horn 14, the transducer 24, and/or the welding controller 20, a control action could include stopping the welding equipment 10, or alternatively, cooling the critical component(s) so that the intended welding frequency is maintained consistently. Additional control actions may be taken, alone or concurrently with those noted above, including activating the external device 17 shown in FIG. 1 via the control signals (arrow 13), for instance illuminating a light, transmitting a maintenance message, and the like. The method 100 then returns to step 102, with the hoist device 40 commanding the robot 50 to rotate back toward the conveyor 32 and resume welding operations.

While the best modes for carrying out the invention have been described in detail, those familiar with the art to which this invention relates will recognize various alternative designs and embodiments for practicing the invention within the scope of the appended claims

The invention claimed is:
1. A vibration welding system comprising:
vibration welding equipment, including a welding horn and a welding anvil, that is configured to form a weld on a work piece clamped between the welding horn and the welding anvil;
a check station;
a welding robot having an arm on which the welding horn and the welding anvil are disposed, wherein the welding robot is configured to selectively move the welding horn and the welding anvil to the check station to determine a status condition of the vibration welding equipment;
a first plurality of sensors positioned with respect to the vibration welding equipment while the work piece is clamped between the welding horn and the welding anvil;
a second plurality of sensors positioned with respect to the check station, wherein the second plurality of sensors includes a pressure-sensitive array; and
a host device in communication with the first and second pluralities of sensors, wherein the host device includes a processor and tangible, non-transitory memory on which is recorded instructions for monitoring the vibration welding equipment to determine the status condition;
wherein the host device is configured to execute the instructions from the memory, via the processor, to thereby:
receive a first set of signals from the first plurality of sensors while the welding horn is actively forming the weld on the work piece;
selectively command the robot to move the welding horn and the anvil to the check station;
activate the second plurality of sensors when the welding horn and the welding anvil reach the check station to thereby receive a second set of signals from the second plurality of sensors, wherein the second set of signals includes a measured force from the pressure-sensitive array; and
process the first and second sets of signals, via the processor, to thereby determine the status condition of the vibration welding equipment.
2. The vibration welding system of claim 1, wherein the first plurality of sensors includes at least one temperature sensor positioned with respect to the vibration welding equipment that is configured to measure a temperature of the vibration welding equipment.

3. The system of claim 2, wherein the at least one temperature sensor includes a temperature sensor that is positioned in proximity to the welding horn and configured to measure a temperature of the welding horn as part of the first set of signals.

4. The system of claim 2, wherein the vibration welding equipment includes a transducer connected to the welding horn that is configured to vibrate the welding horn, and wherein the at least one temperature sensor is connected to the transducer and is configured to measure a temperature of the transducer as part of the first set of signals.

5. The system of claim 4, wherein the transducer is a piezoelectric stack.

6. The system of claim 1, wherein the vibration welding equipment includes a welding controller having a timer, and wherein the first plurality of sensors includes a temperature sensor connected to the timer and configured to measure a temperature of the timer as part of the first set of signals.

7. The system of claim 1, wherein the first plurality of sensors includes an acoustic sensor, and wherein the host device is configured to transmit a pre-recorded baseline acoustic signal to the acoustic sensor, record the transmitted pre-recorded baseline acoustic signal via the acoustic sensor, and compare the recorded signal to the pre-recorded baseline acoustic signal to determine a signal variance as part of the first set of signals.

8. The system of claim 1, wherein the first plurality of sensors includes a three-axis gyroscope connected to a weld head of the welding horn, and wherein the three-axis gyroscope is configured to measure the pitch, yaw, and roll of the weld head as part of the first set of signals.

9. The system of claim 1, wherein the first plurality of sensors includes a displacement sensor that is connected to a weld head of the welding horn, wherein the displacement sensor is configured to measure a distance of separation between the work piece and the weld head as part of the first set of signals.

10. The system of claim 1, wherein the pressure-sensitive sensor array is operable to output an image of the imprint pattern as part of the second set of signals to determine a property of the welding horn, and the host device is configured to detect and quantify the imprint pattern using the processor to determine the status condition.

11. The system of claim 1, wherein the second set of sensors includes an amplitude sensor configured to measure an amplitude of motion of the welding horn.

12. The system of claim 1, wherein the pressure-sensitive array is a nonpolymer-based tactile surface sensor operable to output the measured force as a pressure distribution pattern and magnitude between the welding horn and the welding anvil.

13. A method for determining a status condition of vibration welding equipment, wherein the vibration welding equipment includes a welding horn and a welding anvil, the method comprising:

clamping a work piece between the welding horn and the welding anvil;

forming a weld on the work piece via the vibration welding equipment;

receiving a first set of signals from a first plurality of sensors while actively forming the weld on the work piece, including receiving at least one temperature of the vibration welding equipment;

commanding a welding robot to move the welding horn and the welding anvil to a check station;

selectively activating a second plurality of sensors, including a pressure-sensitive array, when the welding horn and the welding anvil reach the check station;

receiving a second set of signals from a second plurality of sensors positioned with respect to the check station, including receiving at least a measured welding force from the pressure-sensitive array; and processing the first and second sets of signals via the processor to thereby determine a status condition of the vibration welding equipment; and outputting a control signal to an external device to indicate the status condition.

14. The method of claim 13, wherein receiving a temperature of the vibration welding equipment includes receiving a temperature of each of the welding horn, a piezoelectric stack transducer connected to the welding horn, and a welding controller as part of the first set of signals.

15. The method of claim 13, wherein receiving a first set of signals includes receiving, from a displacement sensor, at least one of a distance of separation between the work piece and the weld head and a clamping force acting on the work piece.

16. The method of claim 13, further comprising receiving an image of an imprint pattern on the pressure-sensitive sensor array as part of the second set of signals; and determining a property of the welding horn via a host device using the image of the imprint pattern.

17. The method of claim 13, wherein receiving a first set of signals from a first plurality of sensors includes receiving a measured pitch, yaw, and roll of the weld head from a three-axis gyroscope connected to a weld head of the welding horn.

18. The method of claim 13, wherein forming a weld on a work piece includes forming a weld on a multi-cell battery.

19. The method of claim 13, further comprising:

clamping the welding horn onto a T-shaped gage tool in at least a pair of locations on the welding horn;

measuring, via a displacement sensor, a displacement of the welding horn at each of the locations;

calculating a misalignment value as the difference between the measured displacements; and executing a control action with respect to the welding equipment when the calculated misalignment value exceeds a threshold.

* * * * *